United States Patent [19]

Yoneyama

[11] Patent Number: 5,734,834
[45] Date of Patent: Mar. 31, 1998

[54] X TERMINAL NUMBER LIMITING SYSTEM

[75] Inventor: Hideharu Yoneyama, Tokyo, Japan

[73] Assignee: NEC Corporation, Tokyo, Japan

[21] Appl. No.: 633,418

[22] Filed: Apr. 17, 1996

[30] Foreign Application Priority Data

Apr. 21, 1995 [JP] Japan ......................... 7-097248

[51] Int. Cl.⁶ ........................................ G06F 17/00
[52] U.S. Cl. ........................................ 395/200.56
[58] Field of Search ................. 395/200.56, 200.33,
395/200.31, 200.54, 200.59, 831, 406, 674,
684; 345/200, 197, 60, 68, 329, 332

[56] References Cited

U.S. PATENT DOCUMENTS 4,992,186 2/1991 Goss et al. ........................ 395/831
5,315,711 5/1994 Barone et al. ................... 395/200.38

FOREIGN PATENT DOCUMENTS

5-94272 4/1993 Japan.

*Primary Examiner*—Ellis B. Ramirez
*Attorney, Agent, or Firm*—Young & Thompson

[57] ABSTRACT

In an X window system in which a work station 10 and a plurality of X terminals are connected, screen information managing means 50, upon actuation of a program 70 from an X terminal, if the preset number of X terminals on which screens of the program 70 can be displayed is greater than the number of X terminals in a screen information managing file 60, or information concerning the X terminal which has requested actuation of the program 70 is already present in the screen information managing file 60, or there is any X terminal whose process number is 0 is present in the screen information managing file 60, updates the screen information managing file 60, and at the same time notifies operation possible/impossible judging means 30 that screens of the program 70 can be displayed on that X terminal; and the operation possible/impossible judging means 30 controls the execution and interruption of the program 70.

6 Claims, 6 Drawing Sheets

| Screen information (screen name) | Operation number |
|---|---|
| X0 | 3 |
| X1 | 1 |
| X2 | 2 |

FIG. 7

| Screen information (screen name) | Operation number |
|---|---|
| X0 | 3 |
| X1 | 0 |
| X2 | 2 |

FIG. 8

| Screen information (screen name) | Operation number |
|---|---|
| X0 | 3 |
| X3 | 1 |
| X2 | 2 |

FIG. 9

| Screen information (screen name) | Operation number |
|---|---|
| X0 | 3 |
| X3 | 1 |
| X2 | 1 |

FIG. 10

| Screen information (screen name) | Operation number |
|---|---|
| X0 | 3 |
| X3 | 2 |
| X2 | 1 |

FIG. 11

X TERMINAL NUMBER LIMITING SYSTEM

BACKGROUND OF THE INVENTION

1. Field of the Invention

The present invention relates to an X terminal number limiting system for use in an X window system in which one work station and a plurality of private terminals for X window systems (hereinafter called X terminals) for limiting the number of X terminals on which screens of application programs operating in the work station can be simultaneously displayed.

2. Description of the Related Art

Simultaneous displaying of screens of application programs operating in a work station on a plurality of terminals is essential for improving the efficiency of works, such as program development. This is made possible by a window system in which a plurality of windows are provided on the screen of each terminal, each window corresponding to an application program.

Such programs operating on UNIX, in particular, include the X Window System developed at the Massachusetts Institute of Technology. This system is now the standard window system for use on UNIX. In this system, the program is divided into one part which performs inputting to and outputting from the display and the mouse and an application program part. The former is called the X server and the latter, the X client.

Techniques regarding X window systems include, for example, what is described in "Japanese Kokai 5-94272".

This technique, which is intended for more effective utilization of computer resources among other things, provides for a configuration in which the X client part of the X server system consists in the host computer and the X server part of same, in X window system private terminals.

According to this technique, therefore, when a plurality of X terminals are connected to the host computer, it is impossible to limit the number of X terminals on which the screens of application programs can be displayed simultaneously.

SUMMARY AND OBJECTS OF THE INVENTION

An object of the present invention is to limit, in an X window system wherein one work station and a plurality of X terminals are connected, the number of X terminals on which the screens of application programs operating in the work station can be displayed simultaneously.

A first X terminal number limiting system according to the invention, for use in an X window system in which one work station and a plurality of X terminals are connected, has the following configuration:

said work station includes operation possible/impossible judging means and screen information managing means;

said operation possible/impossible judging means delivers identifying information notified from an X terminal, from which the actuation of a program to be operated in said work station has been requested, to said screen information managing means, and controls, in accordance with a response notified from said screen information managing means, the execution and interruption of the program whose actuation was requested by said X terminal; and said screen information managing means notifies said operation possible/impossible judging means of the possibility or impossibility to display screens of said program on the X terminal identified by the identifying information delivered from said operation possible/impossible judging means.

A second X terminal number limiting system according to the invention, for use in an X window system in which one work station and a plurality of X terminals are connected, has the following configuration:

said work station includes a screen information managing file, operation possible/impossible judging means, operation managing means and screen information managing means;

said screen information managing file stores information concerning the X terminals on which screens of the program operating in said work station are displayed;

said operation possible/impossible judging means delivers identifying information notified from an X terminal, from which the actuation of a program to be operated in said work station has been requested, to said operation managing means, and controls, in accordance with a response notified from said screen information managing means, the execution and interruption of the program whose actuation was requested by said X terminal;

said operation managing means, when notified by said operation possible/impossible judging means of the identifying information of said X terminal, actuates said screen information managing means, and transmits said identifying information to said screen information managing means; and said screen information managing means, when notified by said operation managing means of the identifying information of said X terminal, refers to information concerning the X terminal in said screen information managing file, judges whether or not the program whose actuation has been requested by the X terminal identified by said identifying information can be displayed on said X terminal, and notifies said operation possible/impossible judging means of its judgment.

A third X terminal number limiting system according to the invention has the same configuration as the second X terminal number limiting system except that:

said screen information managing file stores information concerning the X terminals on which screens of the program operating in said work station are displayed and the number of processes whose program screens are displayed on said X terminals; and said screen information managing means, when notified by said operation managing means of the identifying information of the X terminal which has requested actuation of said program, if the preset number of X terminals on which screens of said program can be displayed is greater than the number of X terminals stored in said screen information managing file, adds information concerning the X terminal corresponding to said identifying information to said screen information managing file, then specifies the number of processes corresponding to said X terminal to be 1, and notifies said operation possible/impossible judging means that screens of the program whose actuation has been requested by said X terminal can be displayed on said X terminal.

A fourth X terminal number limiting system according to the invention has the same configuration as the third X terminal number limiting system except that:

said screen information managing means, if information concerning the X terminal which has requested the actuation of said program is already present in said screen information managing file, adds 1 to the number of processes corresponding to said X terminal, and notifies said operation possible/impossible judging means that screens of the program whose actuation has been requested by said X terminal can be displayed on said X terminal.

A fifth X terminal number limiting system according to the invention has the same configuration as the fourth X terminal number limiting system except that:

said screen information managing means, if any X terminal whose process number is 0 is present in said screen information managing file, replaces information on the X terminal whose process number is 0 with information on the X terminal which has requested the actuation of said program, then specifies the number of processes corresponding to the X terminal which has requested the actuation of said program to be 1, and notifies said operation possible/impossible judging means that screens of the program whose actuation has been requested by said X terminal can be displayed on said X terminal.

A sixth X terminal number limiting system according to the invention has the same configuration as the fifth X terminal number limiting system except that:

said screen information managing means, if the preset number of X terminals on which screens of said program can be displayed is not greater than the number of X terminals stored in said screen information managing file, information concerning the X terminal which has requested the actuation of said program is absent in said screen information managing file and no X terminal whose process number is 0 is present in said information managing file, notifies said operation possible/impossible judging means that screens of the program whose actuation has been requested by said X terminal cannot be displayed on said X terminal.

BRIEF DESCRIPTION OF THE DRAWINGS

The invention will be understood more fully from the detailed description given here below and from the accompanying drawings of a preferred embodiment of the invention, which, however, should not be regarded as limiting the scope of the invention but are intended only for explanation and facilitating the understanding of the invention.

Here, it should be noted that like reference numerals represent like elements throughout the disclosure.

DETAILED DESCRIPTION OF THE PREFERRED EMBODIMENT

A preferred embodiment of the present invention will be described in detail below with reference to the drawings.

Figure 1:
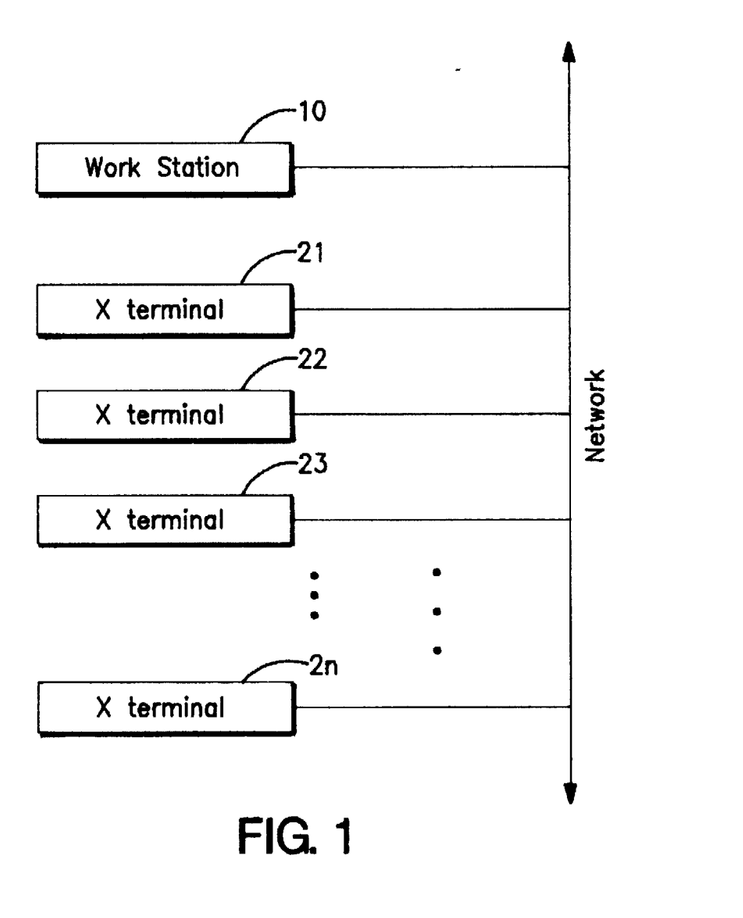
FIG. 1 is a block diagram illustrating the configuration of an X window system to which a preferred embodiment of the invention is applied.

FIG. 1 illustrates the configuration of a system to which an X terminal number limiting system, which is a preferred embodiment of the invention, is applied. This system has a configuration in which X terminals 21, 22, ... 2n instruct a work station 10 to actuate a program 70, and the work station 10 displays screens of the program 70 on the X terminals which have instructed the actuation of the program 70.

Figure 2:
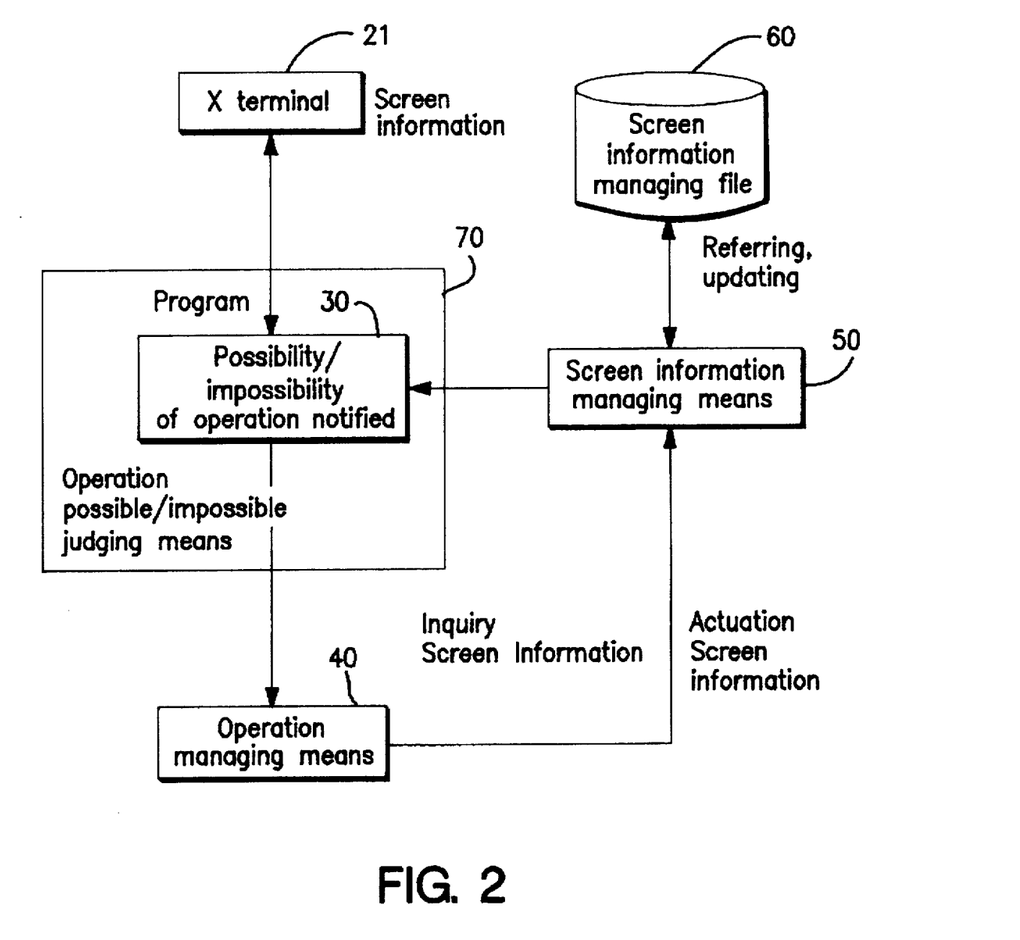
FIG. 2 is a block diagram of the preferred embodiment of the invention.

Now referring to FIG. 2, in the X terminal number limiting system which is an embodiment of the invention, the work station 10 comprises operation possible/impossible judging means 30, operation managing means 40, screen information managing means 50 and a screen information managing file 60.

The operation possible/impossible means 30 delivers the identifying formation of an X terminal having requested the actuation of the program 70, which has been notified from the X terminal, and controls the execution and interruption of the program 70 according to the response notified from the screen information managing means 50.

The operation managing means 40, when notified by the operation possible/impossible judging means 30 of the identifying information of the X terminal which has actuated the program 70, actuates the screen information managing means 50, and transmits the identifying information to the screen information managing means 50.

The screen information managing means 50, when notified by the operation managing means 40 of the identifying information of an X terminal, refers to information concerning the X terminal in the screen information managing file 60, judges where or not screens of the program 70 can be displayed on the X terminal, and notifies the operation possible/impossible judging means 30 of its judgment.

The screen information managing file 60 stores information concerning the X terminals on which screens of the program 70 are displayed.

Incidentally, the operation possible/impossible judging means 30 is usually built into the first step of the program 70 so that it can operate when the program 70 is actuated.

Operation of the preferred embodiment of the present invention when an X terminal 2i has actuated the program 70 will be described below with reference to FIGS. 1 through 11.

Figure 3:
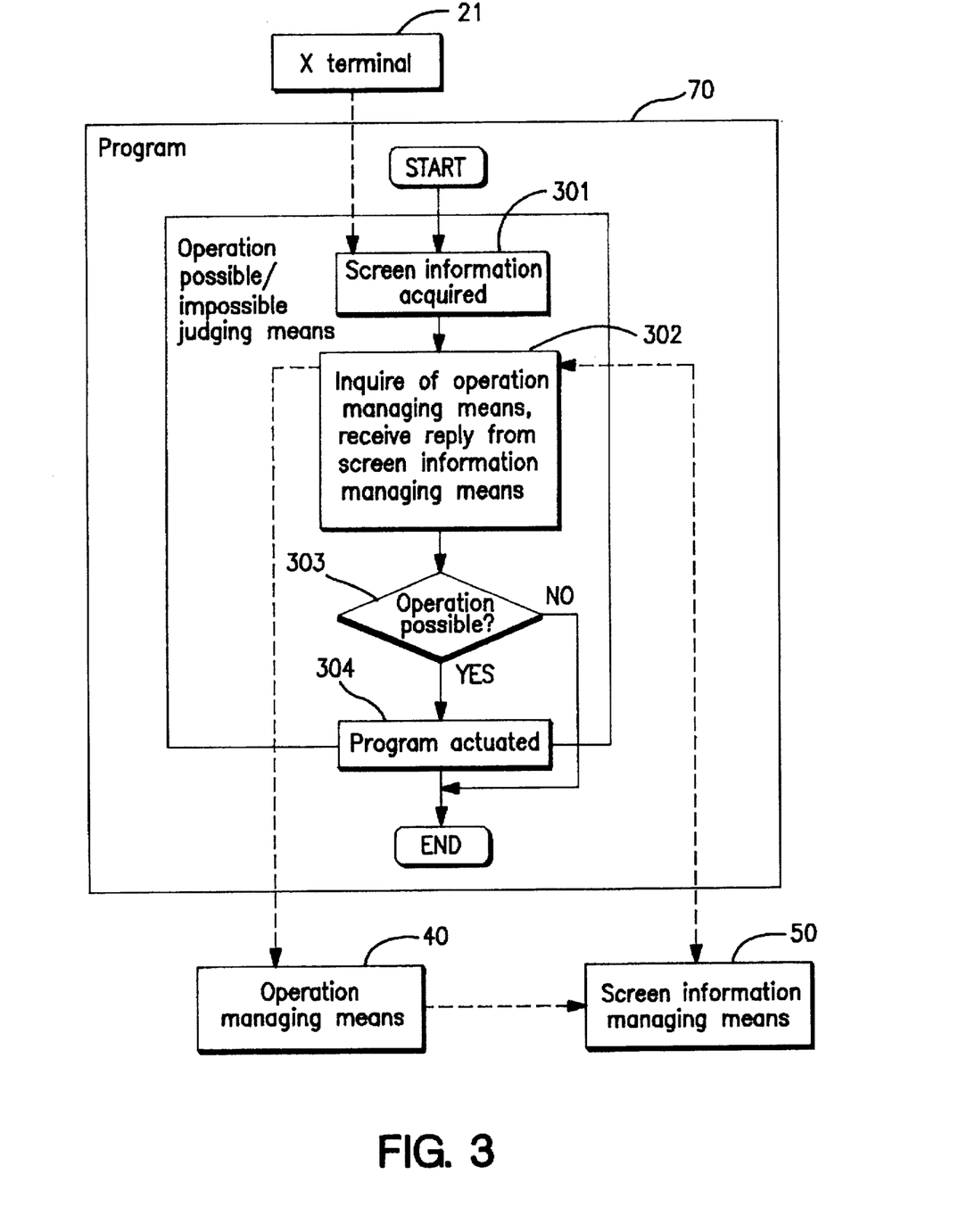
FIG. 3 is a flow chart showing the operation of the operation possible/impossible judging means 30 in the embodiment of the invention.

First will be described processing by the operation possible/impossible judging means 30 with reference to FIG. 3.

The operation possible/impossible judging means 30 first acquires the screen information of the X terminal 2i which is to execute the program 70 (step 301). This screen information, which can uniquely identify the X terminal 2i, usually consists of either a screen name, the address of the X terminal on the network or the like.

The operation possible/impossible judging means 30 then delivers this screen information to the operation managing means 40, and waits for a response from the screen information managing means 50. When a response comes from the screen information managing means 50, it receives the response (step 302) and, on the basis of that response, judges whether or not the program 70 can be operated by the X terminal 2i (step 303). If it judges the operation to be possible, it will actuate the program 70 (step 304) or, if it judges the operation to be impossible, it will not actuate the program 70.

Figure 4:
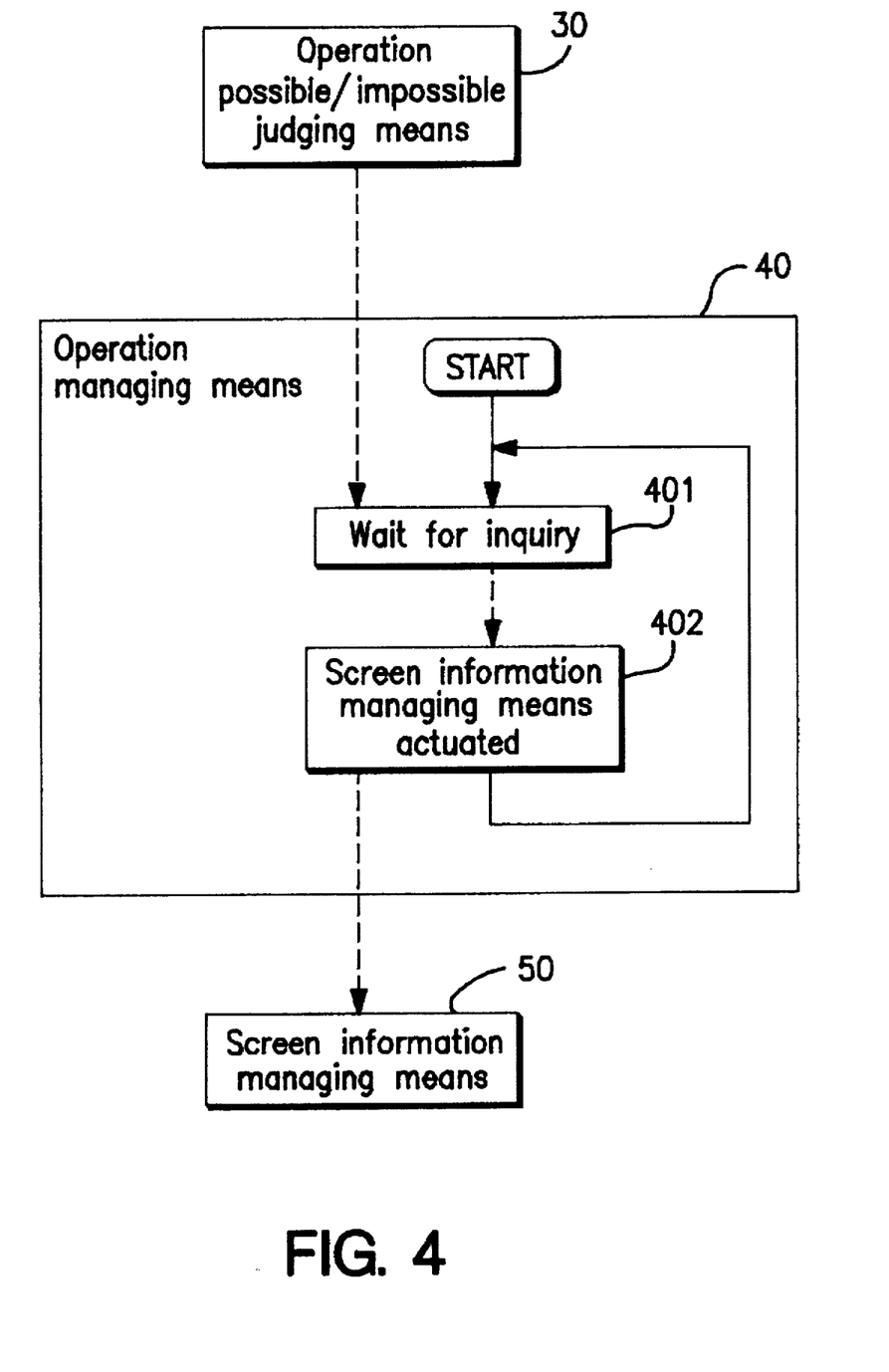
FIG. 4 is a flow chart showing the operation of the operation managing means 40 in the embodiment of the invention.

Next will be described processing by the operation managing means 40 with reference to FIG. 4.

The operation managing means 40 operates when the work station 10 is actuated, and waits for an inquiry from the operation possible/impossible judging means (step 401). Upon receiving an inquiry from the operation possible/impossible judging means 30, it actuates the screen information managing means 50, and transmits the screen information, which is simultaneously delivered at that time, to the screen information managing means 50 (step 402). It then waits for an inquiry from the operation possible/impossible judging means 30 again.

Figure 5:
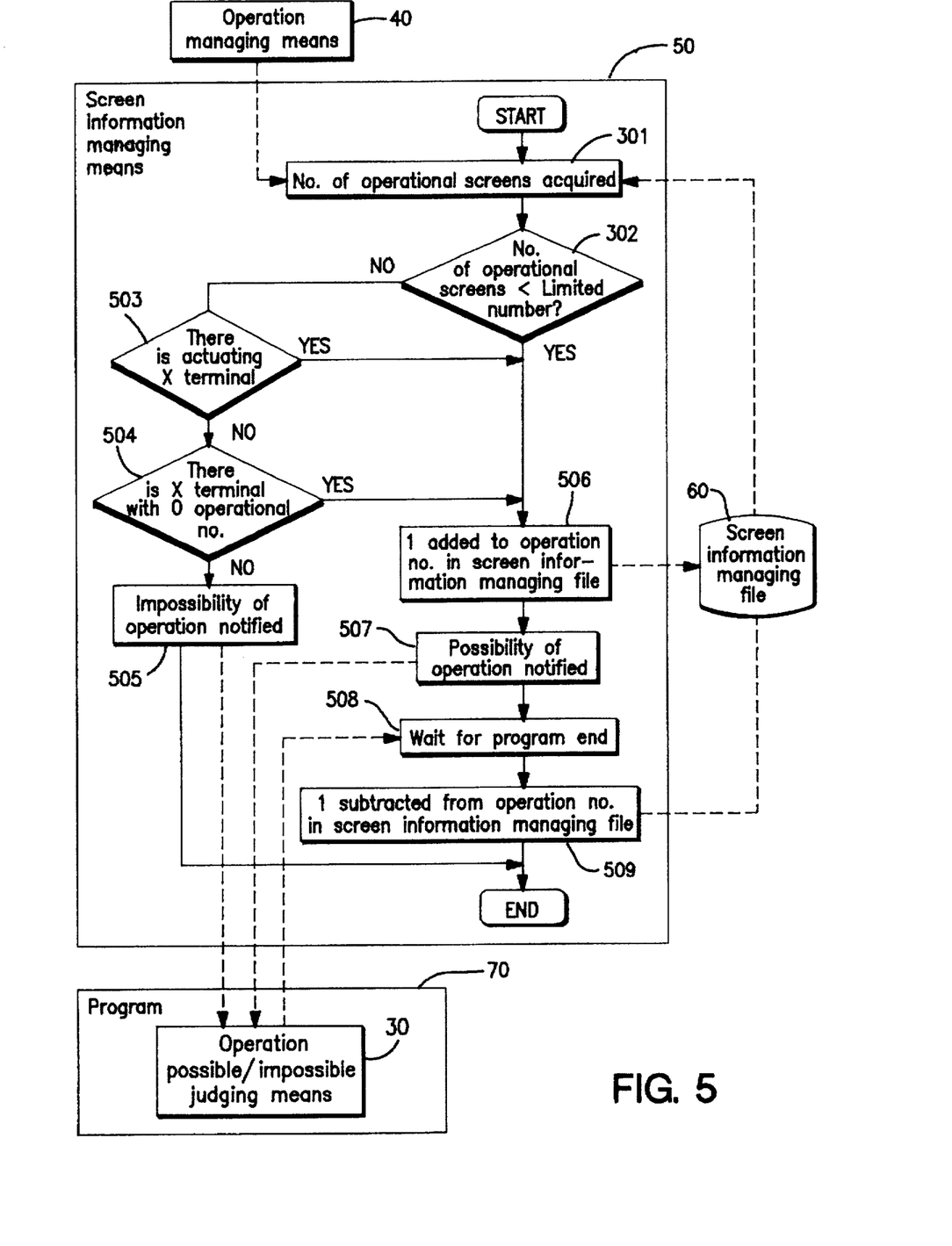
FIG. 5 is a flow chart showing the operation of the screen information managing means 50 in the embodiment of the invention.

Processing by the screen information managing means 50 will now be described with reference to FIG. 5.

The screen information managing means 50 is actuated by the operation managing means 40 and, at the same time, supplied with the screen information. It acquires the number of X terminals which can display screens of the program 70 (hereinafter called the limited number) from the program 70 and other sources, and further acquires the number of X terminals which are currently displaying screens of the program 70 (hereinafter called the operational screen number) from the screen information managing file 60 (step 501).

The screen information managing file 60 stores the correspondences between the limited number of X terminals and the number of processes of the program 70 whose screens are displayed on those X terminals (hereinafter called the operation number).

The screen information managing means 50 compares the limited number and the operational screen number (step 502) and, if either the two numbers are equal or the latter is greater than the former, will judge whether or not information concerning the X terminal 2i which has actuated the program 70 is present in the screen information managing file 60 (step 503). If no information concerning the X terminal 2i is present in the screen information managing file 60, it will further judge whether or not any X terminal whose operation number is 0 is present in the screen information managing means 60 (step 504). If no X terminal whose operation number is 0 is present in the screen information managing file 60, it will notify the operation possible/impossible judging means 30 of the impossibility because no screen of the program 70 can be displayed on the X terminal any longer (step 505).

If, at step 502, the operational screen number is judged to be smaller than the limited number, the X terminal 2i will be added to the screen information managing file 60, and its operation number will be specified to be 1 (step 506). If, at step 503, information concerning the X terminal 2i is judged to be present in the screen information managing file 60, 1 will be added to the operation number corresponding to the X terminal 2i in the screen information managing file 60 (step 506). If, at step 504, any X terminal whose operation number is 0 is judged to be present in the screen information managing file 60, the column in the screen information managing file 60 for X terminals whose operation number is 0 will be rewritten by the X terminal 2i, and its operation number will be specified to be 1 (step 506).

In these cases, since screens of the program 70 can be displayed on X terminals, the operation possible/impossible judging means 30 is notified of the possibility of operation (step 507). The screen information managing means 50 waits for the completion of the program 70 (step 508) and, upon completion of the program 70, subtracts 1 from the operation number corresponding to the X terminal 2i in the screen information managing file 60 to complete the processing (step 509).

Incidentally, steps 501 through 506 in the above-described processing do not necessarily take place in this sequence. It is also possible, for instance, to use a configuration in which the comparisons at steps 503 and 504 are tacitly included in the updating at step 506.

Further regarding the above-described embodiment, contents of the screen information managing file 60 will be specifically supposed and described below.

Figure 6:
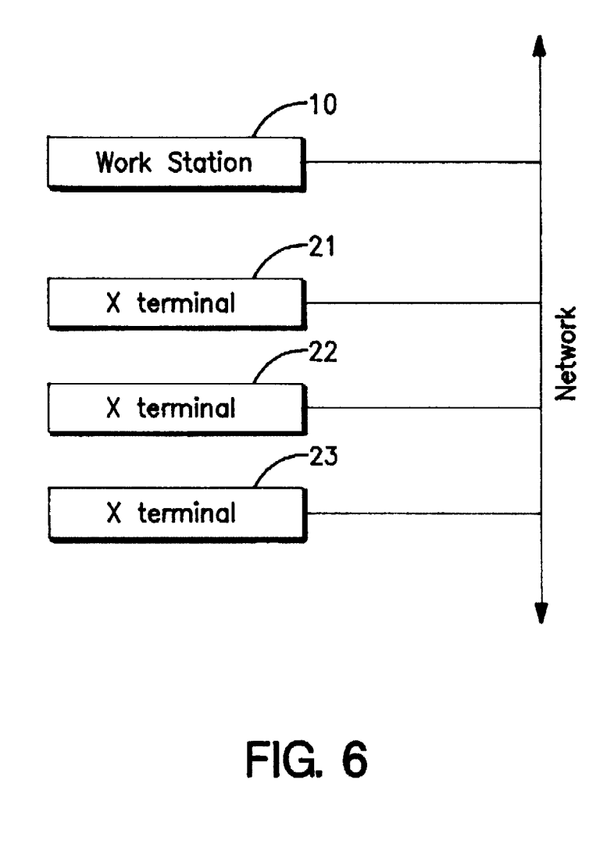
FIG. 6 is a block diagram illustrating the configuration of the X window system for describing the operation of the embodiment of the invention by citing specific values.

For example, as illustrated in FIG. 6, here is supposed a system in which the work station 10 and the X terminals 21, and 22 and 23 are connected.

In this instance, six processes are supposed to be at work in the program 70 operating in the work station 10, of which three processes display screens on the work station 10 itself, one does so on the X terminal 21, and two do so on the X terminal 22. The contents of the screen information managing file 60 in this case are illustrated in FIG. 7.

Figure 7:
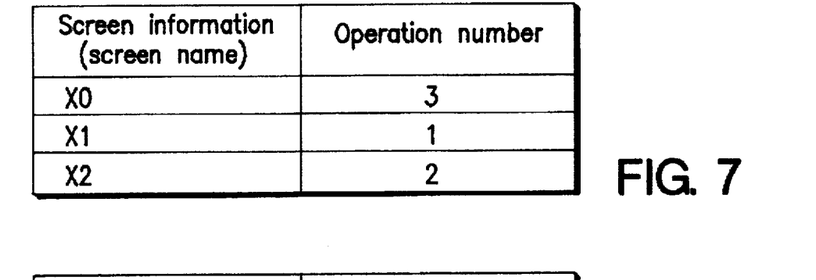
FIG. 7 is a table indicating contents of the screen information managing file in the embodiment of the invention by citing specific values.

In FIG. 7, the limited number is supposed to be "3". The "screen information (screen names)" means the names of screens on the X terminal. In this case, the screen name of the work station 10 is "X0", and those of the X terminals 21, 22 and 23 are respectively "X1", "X2" and "X3". The "operation number", as stated above, means the number of processes of the program 70 displaying screens on the work station 10 and the X terminals 21, 22 and 23.

The operation of the screen information managing means 50 when the program 70 is to be actuated from the X terminal 23 (X3 in screen name) in this state will be described below.

The screen information managing means 50, upon acquiring screen information of the X terminal 23 (X3 in screen name) which has actuated the program 70, acquires operational screen number "3" from the screen information managing file 60. The screen information managing means 50 compares the limited number and the operational screen number and, as the two numbers are equal, the X terminal 23 (X3 in screen name) is absent in the screen information managing file and there is no X terminal whose operation number is 0, notifies the operation possible/impossible judging means 30 of the impossibility of operation.

Figure 8:
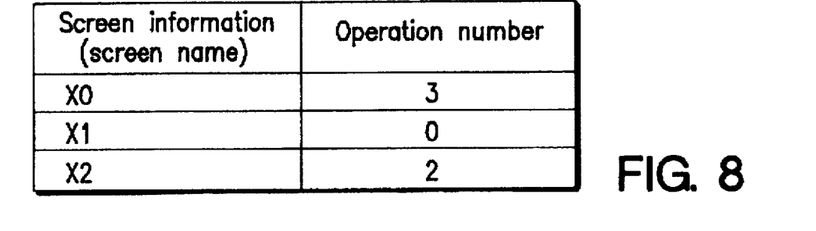
FIG. 8 is a table indicating contents of the screen information managing file in the embodiment of the invention by citing specific values.

Upon completion of the program 70 actuated from the X terminal 21 (X1 in screen name), the screen information managing means 50 subtracts 1 from the operation number corresponding to the X terminal 21 (X1 in screen number), and the contents of the screen information managing file 60 will become such as shown in FIG. 8.

The operation of the screen information managing means 50 when the program 70 is to be actuated from the X terminal 23 (X3 in screen name) in this state will be described below.

The screen information managing means 50, upon acquiring screen information of the X terminal 23 (X3 in screen name) which has actuated the program 70, acquires operational screen number "3" from the screen information managing file 60. The screen information managing means 50 compares the limited number and the operational screen number and, as the two numbers are equal and, though the X terminal 23 (X3 in screen name) is absent in the screen information managing file 60, but the operation number of the X terminal 21 (X1 in screen name) is 0, replaces the X terminal 21 (X1 in screen name) with the X terminal 23 (X3 in screen name) in the X terminal column of the screen information managing file 60, specifying the operation number on that screen to be 1. The contents of the screen information managing file 60 are shown in FIG. 9.

Figure 9:
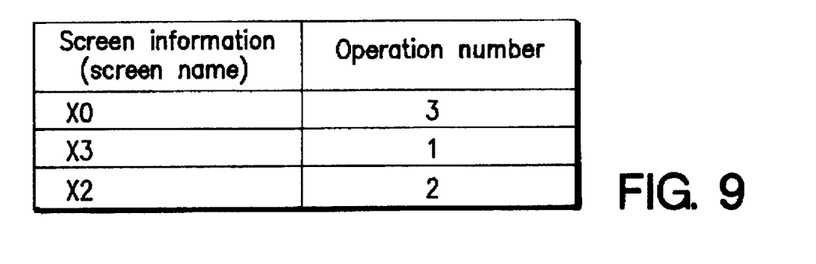
FIG. 9 is a table indicating contents of the screen information managing file in the embodiment of the invention by citing specific values.

Next, upon completion of the program 70 actuated from the X terminals 22 (X2 in screen name), the screen information managing means 50 subtracts 1 from the operation number corresponding to the X terminal 22 (X2 in screen number), and the contents of the screen information managing file 60 will become such as shown in FIG. 9.

The operation of the screen information managing means 50 when the program 70 is to be actuated from the X terminal 21 (X1 in screen name) in this state will be described below.

The screen information managing means 50, upon acquiring screen information of the X terminal 23 (X3 in screen name) which has actuated the program 70, acquires operational screen number "3" from the screen information managing file 60. The screen information managing means 50 compares the limited number and the operational screen number and, as the two numbers are equal, the X terminal 23 (X3 in screen name) is absent in the screen information managing file 60, and there is no X terminal whose operation number is 0, notifies the operation possible/impossible judging means 30 of the impossibility of operation.

Figure 10:
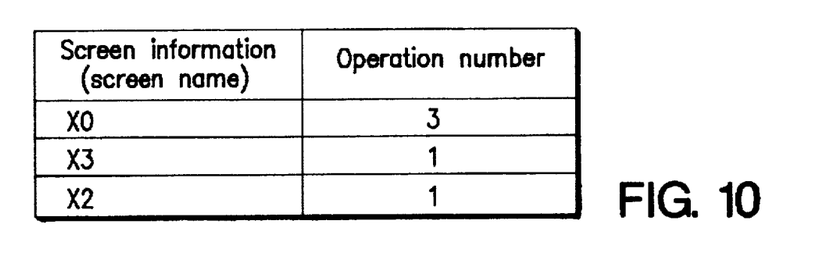
FIG. 10 is a table indicating contents of the screen information managing file in the embodiment of the invention by citing specific values.

The operation of the screen information managing means 50 when the program 70 is to be actuated from the X terminal 23 (X3 in screen name) in the state of FIG. 10 will be described below.

Figure 11:
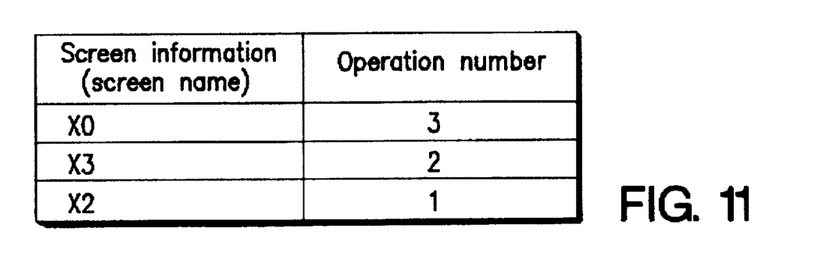
FIG. 11 is a table indicating contents of the screen information managing file in the embodiment of the invention by citing specific values.

The screen information managing means 50, upon acquiring screen information of the X terminal 23 (X3 in screen name) which has actuated the program 70, acquires operational screen number "3" from the screen information managing file 60. The screen information managing means 50 compares the limited number and the operational screen number and, though the two numbers are equal in this case, the X terminal 23 (X3 in screen name) is present in the screen information managing file 60, adds 1 to the operation number corresponding to the X terminal 23 (X3 in screen number) in the screen information managing file 60. The contents of the screen information managing file 60 at this time are shown in FIG. 11.

This completes processing by the X terminal number limiting system, which is a preferred embodiment of the present invention.

The X terminal number limiting system according to the invention, for use in an X window system in which the work station 10 and a plurality of X terminals are connected, is characteristic in that the screen information managing means 50, upon actuation of the program 70 from an X terminal, if the preset number of X terminals on which screens of the program 70 can be displayed is greater than the number of X terminals in the screen information managing file 60, or information concerning the X terminal which has requested actuation of the program 70 is already present in the screen information managing file 60, or there is any X terminal whose process number is 0 is present in the screen information managing file 60, updates the screen information managing file 60, and notifies the operation possible/impossible judging means 30 that screens of the program 70 can be displayed on that X terminal. It is also characteristic in that the operation possible/impossible judging means 30 can control the execution and interruption of the program 70 in response to this notification.

This configuration enables the X terminal number limiting system according to the invention, for use in an X window system in which one work station and a plurality of X terminals are connected, to limit the number of X terminals on which screens of an application program operating in the work station can be displayed simultaneously.

Although the invention has been described in detail above with reference to a preferred embodiment thereof, it will be appreciated by those skilled in the art that this embodiment has been provided solely for the purpose of illustration, and is in no way to be regarded as limiting the scope of the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. An X terminal number limiting system for use in an X window system in which one work station and a plurality of X terminals are connected, wherein:

said work station includes operation possible/impossible judging means and screen information managing means;

said operation possible/impossible judging means delivers identifying information notified from an X terminal, from which the actuation of a program to be operated in said work station has been requested, to said screen information managing means, and controls, in accordance with a response notified from said screen information managing means, the execution and interruption of the program whose actuation was requested by said X terminal; and said screen information managing means notifies said operation possible/impossible judging means of the possibility or impossibility to display screens of said program on the X terminal identified by the identifying information delivered from said operation possible/impossible judging means.

2. An X terminal number limiting system for use in an X window system in which one work station and a plurality of X terminals are connected, wherein:

said work station includes a screen information managing file, operation possible/impossible judging means, operation managing means and screen information managing means;

said screen information managing file stores information concerning the X terminals on which screens of the program operating in said work station are displayed;

said operation possible/impossible judging means delivers identifying information notified from an X terminal, from which the actuation of a program to be operated in said work station has been requested, to said operation managing means, and controls, in accordance with a response notified from said screen information managing means, the execution and interruption of the program whose actuation was requested by said X terminal;

said operation managing means, when notified by said operation possible/impossible judging means of the identifying information of said X terminal, actuates said screen information managing means, and transmits said identifying information to said screen information managing means; and said screen information managing means, when notified by said operation managing means of the identifying information of said X terminal, refers to information concerning the X terminal in said screen information managing file, judges whether or not the program whose actuation has been requested by the X terminal identified by said identifying information can be displayed on said X terminal, and notifies said operation possible/impossible judging means of its judgment.

3. An X terminal number limiting system, as claimed in claim 2, wherein:

said screen information managing file stores information concerning the X terminals on which screens of the program operating in said work station are displayed and the number of processes whose program screens are displayed on said X terminals; and said screen information managing means, when notified by said operation managing means of the identifying information of the X terminal which has requested actuation of said program, if the preset number of X terminals on which screens of said program can be displayed is greater than the number of X terminals stored in said screen information managing file, adds information concerning the X terminal corresponding to said identifying information to said screen information managing file, then specifies the number of processes corresponding to said X terminal to be 1, and notifies said operation possible/impossible judging means that screens of the program whose actuation has been requested by said X terminal can be displayed on said X terminal.

4. An X terminal number limiting system, as claimed in claim 3, wherein:

said screen information managing means, if information concerning the X terminal which has requested the actuation of said program is already present in said screen information managing file, adds 1 to, the number of processes corresponding to said X terminal, and notifies said operation possible/impossible judging means that screens of the program whose actuation has been requested by said X terminal can be displayed on said X terminal.

5. An X terminal number limiting system, as claimed in claim 4, wherein:

said screen information managing means, if any X terminal whose process number is 0 is present in said screen information managing file, replaces information on the X terminal whose process number is 0 with information on the X terminal which has requested the actuation of said program, then specifies the number of processes corresponding to the X terminal which has requested the actuation of said program to be 1, and notifies said operation possible/impossible judging means that screens of the program whose actuation has been requested by said X terminal can be displayed on said X terminal.

6. An X terminal number limiting system, as claimed in claim 5, wherein:

said screen information managing means, if the preset number of X terminals on which screens of said program can be displayed is not greater than the number of X terminals stored in said screen information managing file, information concerning the X terminal which has requested the actuation of said program is absent in said screen information managing file and no X terminal whose process number is 0 is present in said information managing file, notifies said operation possible/ impossible judging means that screens of the program whose actuation has been requested by said X terminal cannot be displayed on said X terminal.

* * * * *